United States Patent Office 3,421,977
Patented Jan. 14, 1969

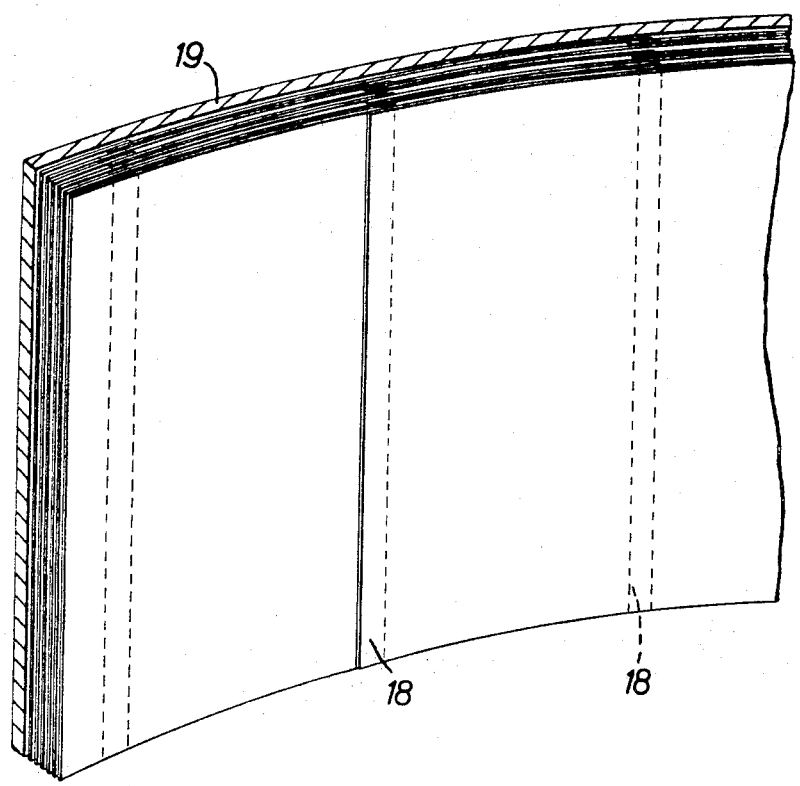

3,421,977
THERMAL INSULATION
William George Hutchinson, Lymm, and Leslie Charles Cole, Culcheth, Warrington, England, assignors to United Kingdom Atomic Energy Authority, London, England
Filed Apr. 16, 1965, Ser. No. 448,649
Claims priority, application Great Britain, Apr. 23, 1964, 16,979/64
U.S. Cl. 176—40
Int. Cl. G21c 15/20
5 Claims

ABSTRACT OF THE DISCLOSURE

Thermal insulation for direct contact with liquids is composed of metal sheets. Along lines which are possibly ribbed, continuous welds are made to join the sheets directly to one another and so define between the sheets a multiplicity of gas-filled compartments which are fully sealed from one another.

---

Figure 1:
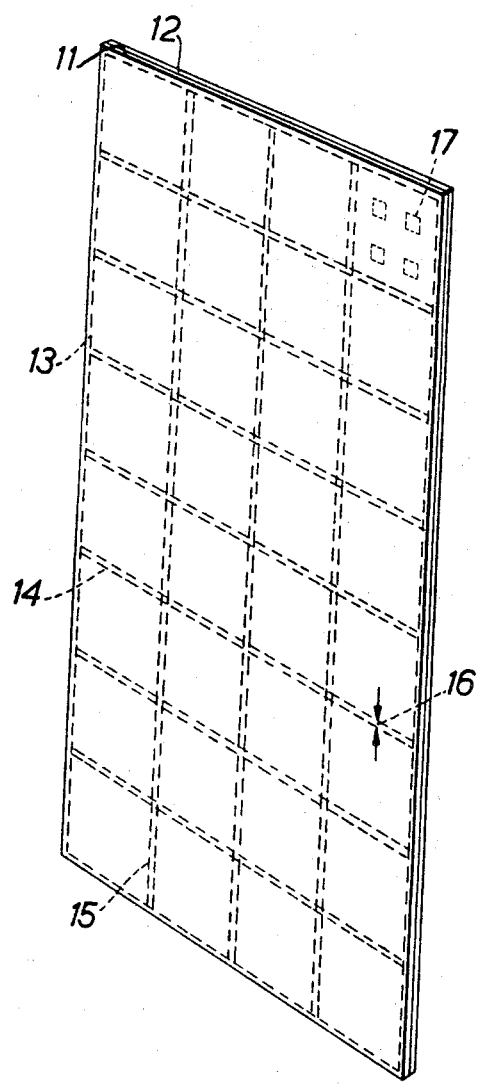

The present invention relates to thermal insulation; more specifically it concerns thermal insulation which is suitable for use in nuclear reactors.

Thermally insulating materials available hitherto for this duty are based on a gas interlayer between metal sheets. Metal structure included between the sheets is necessary for rigidity and for the obstruction of circulating movements of the gas filling. This interposed metal structure is, however, a potential source of good heat conducting paths and is therefore generally kept to a minimum, as is also the amount of joining with the metal sheets.

According to the present invention, thermal insulation for direct contact with liquids comprises substantially parallel metal sheets which, along lines describing a multiplicity of closed shapes within the outline of the sheets, are joined directly to each other by welding so as to define between the sheets a multiplicity of gas-filled compartments which are sealed from one another. This construction has been evolved taking account of the possibility of the outer skin formed by the metal sheets being punctured or in some other way breached during service. In this event the ingress of a liquid to which the insulation is exposed is limited to the region of the breach and the loss of insulating property consequent upon liquid ingress is localised instead of being allowed to spread by leakage between compartments. For liquid environments, this advantage offsets any reduction in insulating performance which may result from the use, compared with the available, more conventional materials, of rather more extensive joining between the sheets. Compared with another known form of thermal insulation in which sealed compartments are defined by an interposed openwork structure metallurgically bonded to the sheets, the insulation in accordance with the invention is considered to provide more reliable sealing and is more simple to manufacture. The bonding in the known form has to be effected continuously along the edges of the openwork structure, as by brazing, whereas with the invention the welding is carried out conveniently by means of a resistance seam welding technique.

Depending on the thickness of gas interlayer required, plain-faced metal sheets may be welded face to face or at least one of the sheets may be ribbed for greater separation. If such ribs are used, they form a pattern of closed shapes conforming to the desired arrangement of compartments. Preferably the ribs are raised on the inner face of the sheet by pressing depressions into the other face, an operation which can be carried out by rolling between appropriate forming rolls.

It is generally desirable that the compartments are contiguous and that the welds are along sets of parallel straight lines, these sets of lines being in different directions so as to form a criss-cross pattern. Using two sets of parallel lines perpendicular to each other a pattern of rectangles or squares is formed.

For service at high temperatures, the gas filling may be at a sub-atmospheric pressure at room temperature so as to avoid deformation by internal pressure when the insulation is in use. To achieve this reduced pressure filling, two sheets to form an insulating panel may be joined along their edges followed by the withdrawal of some of the air from between the sheets through a vent opening left for this purpose. The opening is then sealed and subsequently the operation for sub-dividing the interior into compartments is carried out.

A particular example of the application of the invention is in a nuclear reactor cooled by a liquid metal, such as sodium, and the invention will be further described with reference to the accompanying drawings showing an embodiment designed with this particular application in mind. In the drawings:

FIGURE 1 is a perspective view of a panel of the thermal insulation, and
FIGURE 2 is a perspective view of the use of the insulation of FIGURE 1 as lagging on cylindrically curved plate in a sodium cooled nuclear reactor.

In the panel of FIGURE 1, two coextensive flat and plain-faced stainless steel sheets 11 and 12 are welded together around their edges in face to face abutting relationship by continuous edge welds as indicated by the broken line 13; conveniently, this edge welding operation will have been carried out with an argon arc torch.

Straight narrow seam welds extend continuously between opposite edges, these seam welds being in sets perpendicular to each other as indicated by the broken lines 14 and 15. The spacing of the seam welds in both sets is the same so that the sheet interface is divided into compartments of square shape. It is assumed for the purpose of this example that the sheets were laid together in a typical workshop atmosphere and therefore that air is the gas which is trapped at the interface.

Specimen dimensions, given merely by way of illustration are as follows: Sheet size 8 feet by 4 feet, thickness 0.048 inch, seam weld spacing 1 foot, weld width 0.10 inch approximately. When considering FIGURE 1 in conjunction with these dimensions, it will be appreciated that the showing of certain of the features is on an exaggerated scale for clarity.

The seam welds will conveniently have been made by a resistance seam welding technique. By reduction of the seam width (the dimension indicated 16) a significant reduction can be obtained in the ratio of the area of direct contact of the sheets to the overall area of panel. The insulation efficiency is of course increased by reduction of this ratio. In general, the seam weld width should be as low as possible consistent with an adequate guarantee of reliability in service. With the dimensions given above this ratio would be about 2%. The aim in more general terms should be to keep within an upper limit of, say, 5%.

To improve the separation of the sheets, and hence increase the amount of air trapped at the interface, one or more spacer inserts may be included in the compartments. Such inserts may be non-metallic and relatively small; for example, they may be small pieces or discs of sheet thermal insulant, such as paper, card or asbestos cloth, and preferably they are affixed to one or other of the sheets prior to welding them together. At the top right hand corner of FIGURE 1, there is shown one way of incorporating this feature, the square inserts 17 being arranged in the compartment in a square formation.

An advantage of the illustrated panel over the previously mentioned ribbed plate construction arises where the panels have to be cut to shape or joined together at a cut edge. If the cut is across a compartment, simple edge welding will suffice to restore the seal of this compartment.

As seen in FIGURE 2, the lagging, which is to act as a thermal shield around the core of the nuclear reactor, is composed of several layers of the panels. In each layer, of which there are six, the panels have a margin of overlap as indicated at 18 and the overlaps of adjacent layers are staggered; as illustrated they are staggered by half the distance between consecutive overlaps in the same layer. To obtain a curvature of the initially flat panels to match that of the plate 19, the panels may be passed between forming rolls. Mounting of the panels is by any suitable attachment means. In the interspaces between panels formed by the staggering of the overlaps it may not be feasible to exclude the liquid metal coolant; consequently the panels in every layer are constructed in accordance with the invention on account of the direct exposure to liquid. There could, however, be applications of a multi-layer construction in which only one layer becomes exposed to liquid and in this case the other layers could be of other forms of thermal insulation.

We claim:

1. In a liquid metal cooled nuclear reactor, a thermal insulating shield for the core of the reactor, said shield comprising a plurality of adjacent insulating layers, at least the inner layer being exposed to a liquid metal reactor coolant and comprising a plurality of edge-joined metal panels, each of said panels comprising inner and outer substantially parallel metal sheets and including continuous welds directly joining said sheets along lines describing a multiplicity of closed shapes within the outline of said sheets to define between said sheets a multiplicity of gas containing compartments being fully sealed from one another.

2. In a device wherein a thermal insulating element is provided to prevent heat loss from a fluid, the improvement wherein said element comprises a metal panel comprising first and second substantially parallel metal sheets and including continuous welds directly joining said sheets along lines describing a multiplicity of closed shapes within the outline of said sheets to define between said sheets a multiplicity of gas containing compartments, said compartments being fully sealed from one another.

3. In a device according to claim 2, the improvement wherein said welds are along sets of parallel straight lines, these sets of lines being in different directions so as to form a criss-cross pattern.

4. In a device according to claim 2, the improvement wherein said gas-containing compartments also contain spacer inserts in the form of thin sheet material.

5. In a device wherein a thermal insulating element is provided to prevent heat loss from a fluid, the improvement wherein said element comprises a plurality of adjacent insulating layers, each of said layers comprising a plurality of edge-joined metal panels, each of said panels comprising first and second substantially parallel metal sheets and including continuous welds directly joining said sheets along lines describing a multiplicity of closed shapes within the outline of said sheets to define between said sheets a multiplicity of gas containing compartments, said compartments being fully sealed from one another.

References Cited

UNITED STATES PATENTS

| 1,853,374 | 4/1932  | Oxhandler  | 161—127   |
| 2,710,335 | 6/1955  | Wong       | 52—309    |
| 2,939,811 | 6/1960  | Dillon     | 52—2      |
| 3,024,525 | 3/1962  | Wisberger  | 29—480 X  |
| 3,151,712 | 10/1964 | Jackson    | 52—615    |
| 3,190,412 | 6/1965  | Rutter et al. | 52—615 X |

FRANK L. ABBOTT, *Primary Examiner.*

ALFRED C. PERHAM, *Assistant Examiner.*

U.S. Cl. X.R.

29—191; 52—506, 615, 622; 165—136; 176—87